Oct. 29, 1957  C. H. BROWN  2,811,343
HEAVY DUTY CUTTER BIT FOR BORING TYPE MINER
Filed Dec. 24, 1956
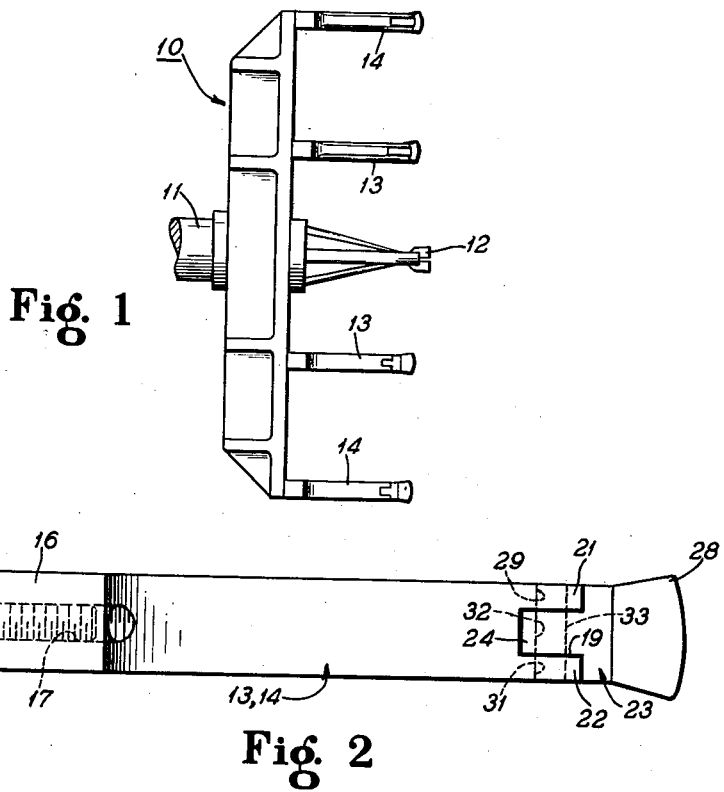
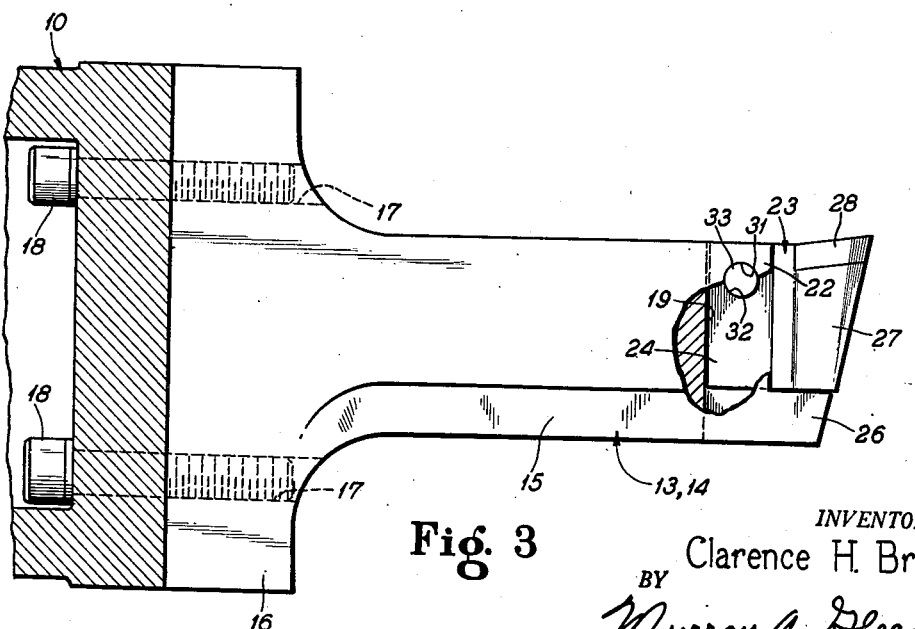
INVENTOR.
Clarence H. Brown
BY
Murray A. Gleeson
ATTORNEY United States Patent Office 2,811,343
Patented Oct. 29, 1957

2,811,343

HEAVY DUTY CUTTER BIT FOR BORING TYPE MINER

Clarence H. Brown, Chicago, Ill., assignor to Goodman Manufacturing Company, Chicago, Ill., a corporation of Illinois Application December 24, 1956, Serial No. 630,313

1 Claim. (Cl. 262—33)

This invention relates to heavy duty cutter bits for the boring arms of a boring type miner.

One of the objects of this invention is to provide an improved cutter bit for the boring arms of a boring type miner.

Another object is to provide a heavy duty support for a cutter bit holder, and to provide a structure therewith for taking the forces against such cutter bit holder.

Other objects and important features of the invention will be apparent from a study of the specification following taken with the drawing which together describe and illustrate a preferred embodiment of the invention and what is now considered to be the best mode of practicing the principles thereof. Other embodiments of the invention will be suggested to those having the benefit of the teachings herein and such other embodiments are intended to be reserved especially as they fall within the spirit and scope of the subjoined claim.

In the drawing:

Fig. 1 is a side view of a boring arm of a boring type miner, said boring arm having an improved heavy duty cutter bit according to the present invention mounted thereon;

Fig. 2 is an end view to an enlarged scale of the heavy duty cutter bit and support according to the present invention; and Fig. 3 is a side view thereof.

Referring now to the drawing, the improved heavy duty cutter bit is arranged particularly for use with a boring arm 10 of a boring type miner, such as may be of the type as shown in the Miller Patent No. 2,770,448, issued November 13, 1956, for Extensible Rotary Cutter Bar for Boring Type Miner. The boring arm 10 seen in Fig. 1 is arranged to rotate on a shaft 11 and includes a central pilot cutter 12 as may be disclosed in Cartlidge Patent No. 2,754,100, issued July 10, 1956, for Burster Cone for Continuous Miner Boring Head.

The boring arm 10 is arranged to rotate in a vertical plane and has mounted thereon a pair of cutter bit supports 13 which rotate on a fixed radius inward of identical cutter bit supports 14, the central pilot cutter 12 and the cutter bit supports 13 and 14 and the cutter bits supported thereon being arranged to cut a plurality of concentric kerfs in a solid seam of coal or the like.

Referring now to Figs. 2 and 3, each of the cutter bit supports 13 or 14 includes a base 16 which extends tangentially to the path of rotation of the boring arm 10, and each such base portion 16 is tapped as at 17 to receive a bolt or cap screw 18 for securing the support to the front of the boring arm as seen in Fig. 3.

Each cutter bit support 13 or 14 extends in a direction perpendicular to the front face of the boring arm 10, and is chamfered or relieved as at 15 on the trailing side thereof to provide clearance in the kerf which it cuts. The end of the support remote from the base 16 is provided with a slot 19 between side jaws 21 and 22 formed integrally with the support 13. The slot 19 is arranged to receive a bit holder 23 having a T-shaped cross section as seen in Fig. 2, and a leg 24 of the bit holder 23 is held between the two jaws 21 and 22 of the slot 19.

The trailing edge of the support 13 or 14 is arranged with the jaws 21 and 22 to have extensions 26 therefrom to provide a pair of bearing surfaces for the trailing side of a head portion 27 of the T-shaped bit holder 23. The leading side or edge of the head portion 27 of the bit holder 23 has brazed thereto a cutter bit wear element 28 as seen particularly in Fig. 3.

The jaws 21 and 22 are provided respectively with aligned apertures 29 and 31 at a point adjacent their leading sides and the leg 24 of the T-shaped bit holder 23 is likewise provided with an aperture 32 which is aligned with the apertures 29 and 31. The so aligned apertures are arranged to receive a pin 33 to hold the bit holder 23 between the jaws 21 and 22 and against the spaced stops 26.

During rotation of the boring arm 10 the pressure against the cutter bit wear elements 28 at each support 13 or 14 is taken largely by the stops 26 extending from the jaws 21 and 22, but a portion of such force is capable of being taken by the pin 33 also.

While the invention has been described in terms of a preferred embodiment its scope is intended to be limited only by the claim here appended.

I claim as my invention:

A heavy duty cutter bit and mounting therefor particularly adapted for use on the boring arm of a boring type miner comprising a bit support having a base with portions extending tangentially to the path of rotation of said boring arm, means for securing said portions to said boring arm, a slot formed in the end of said support remote from said base including spaced jaws having a pair of spaced stops extending from said jaws on the trailing side of said support, a bit holder having a T-shaped cross section with the leg thereof engaged between the jaws flanking said slot, the head of said bit holder bearing against the aforesaid pair of spaced stops, a cutter bit wear element disposed in the leading edge of said T-shaped bit holder, and aligned apertures formed in the aforesaid leg and in said jaws adjacent the leading edge of said first named support for locating said bit holder while the trailing edge of said bit holder is in engagement with said stops to take the load against said bit holder.

No references cited.